(12) United States Patent
Bordeleau et al.

(10) Patent No.: US 10,834,669 B2
(45) Date of Patent: Nov. 10, 2020

(54) STATEFUL NETWORK SLICE SELECTION USING REPLAY OF CONNECTION HANDSHAKE

(71) Applicant: VMware, Inc., Palo Alto, CA (US)

(72) Inventors: Marc-Andre Bordeleau, Shawinigan (CA); Raja Kommula, Cupertino, CA (US); Jeremy Tidemann, Urbana, IL (US); Constantine Polychronopoulos, Saratoga, CA (US); Edward Choh, Richmond (CA); Ojas Gupta, Mountain View, CA (US); Georgios Oikonomou, Patras (GR); Robert Kidd, Champaign, IL (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/443,813

(22) Filed: Jun. 17, 2019

(65) Prior Publication Data

US 2020/0275359 A1    Aug. 27, 2020

Related U.S. Application Data

(60) Provisional application No. 62/809,656, filed on Feb. 24, 2019, provisional application No. 62/809,558, filed on Feb. 22, 2019.

(51) Int. Cl.
*H04W 48/18* (2009.01)
*H04L 12/66* (2006.01)
(Continued)

(52) U.S. Cl.
CPC ........ *H04W 48/18* (2013.01); *G06F 9/45558* (2013.01); *H04L 12/66* (2013.01);
(Continued)

(58) Field of Classification Search
CPC ...... H04W 48/18; H04L 12/66; H04L 43/028; H04L 69/163; G06F 9/45558; G06F 2009/45595
See application file for complete search history.

(56) References Cited

U.S. PATENT DOCUMENTS 10,111,163 B2   10/2018   Vrzic et al.
10,555,134 B2    2/2020   Shaw et al.
(Continued)

OTHER PUBLICATIONS

Non-Published Commonly Owned Related International Patent Application PCT/US2020/016833 with similar specification, filed Feb. 5, 2020, 95 pages, VMware, Inc.
(Continued)

*Primary Examiner* — Brian D Nguyen
(74) *Attorney, Agent, or Firm* — Adeli LLP

(57) ABSTRACT

Some embodiments provide a method for a network slice selector that forwards messages from endpoint electronic devices onto different network slices of multiple network slices. The method receives a set of connection initiation messages setting up a connection between an endpoint electronic device and a network domain. The method forwards the set of connection initiation messages from the endpoint electronic device onto a default network slice while storing data regarding the connection initiation messages. After the connection is setup, the method receives a data message belonging to the connection from the endpoint electronic device. The method selects one of the plurality of network slices to which the electronic device has access as the network slice for the connection based on analysis of the received data message. The method retransmits the set of connection initiation messages on the selected network slice between the network slice selector and a network gateway.

23 Claims, 11 Drawing Sheets

(51) Int. Cl.
*H04L 12/26* (2006.01)
*G06F 9/455* (2018.01)
*H04L 29/06* (2006.01)

(52) U.S. Cl.
CPC .......... *H04L 43/028* (2013.01); *H04L 69/163* (2013.01); *G06F 2009/45595* (2013.01)

(56) References Cited

U.S. PATENT DOCUMENTS

| | | | |
|---|---|---|---|
| 10,609,530 | B1 | 3/2020 | Patil et al. |
| 10,708,143 | B2 | 7/2020 | Zhang et al. |
| 2015/0381493 | A1 | 12/2015 | Bansal et al. |
| 2017/0085628 | A1 | 3/2017 | Mahindra et al. |
| 2017/0142591 | A1 | 5/2017 | Vrzic |
| 2017/0289791 | A1* | 10/2017 | Yoo ................ H04W 68/005 |
| 2018/0219762 | A1 | 8/2018 | Wang et al. |
| 2018/0332441 | A1 | 11/2018 | Shaw et al. |
| 2018/0368060 | A1 | 12/2018 | Kedalagudde et al. |
| 2019/0123963 | A1 | 4/2019 | Tang et al. |
| 2019/0158364 | A1 | 5/2019 | Zhang et al. |
| 2019/0159117 | A1* | 5/2019 | Kuge ................ H04W 76/11 |
| 2019/0174573 | A1 | 6/2019 | Velev et al. |
| 2019/0191309 | A1 | 6/2019 | Kweon et al. |
| 2019/0200286 | A1 | 6/2019 | Usui et al. |
| 2019/0373520 | A1 | 12/2019 | Sillanpää |
| 2020/0053531 | A1 | 2/2020 | Myhre et al. |
| 2020/0077327 | A1* | 3/2020 | Duan ................ H04W 74/0833 |
| 2020/0120721 | A1* | 4/2020 | Lau ................ H04W 48/12 |
| 2020/0137621 | A1* | 4/2020 | Yang ................ H04W 48/16 |

OTHER PUBLICATIONS

Non-Published Commonly Owned Related U.S. Appl. No. 16/443,810 with similar specification, filed Jun. 17, 2019, 95 pages, VMware, Inc.

Non-Published Commonly Owned Related U.S. Appl. No. 16/443,812 with similar specification, filed Jun. 17, 2019, 38 pages, VMware, Inc.

Non-Published Commonly Owned Related U.S. Appl. No. 16/443,815 with similar specification, filed Jun. 17, 2019, 49 pages, VMware, Inc.

Non-Published Commonly Owned Related U.S. Appl. No. 16/443,816 with similar specification, filed Jun. 17, 2019, 54 pages, VMware, Inc.

Non-Published Commonly Owned Related U.S. Appl. No. 16/443,818 with similar specification, filed Jun. 17, 2019, 64 pages, VMware, Inc.

Non-Published Commonly Owned U.S. Appl. No. 16/568,322, filed Sep. 12, 2019, 55 pages, VMware, Inc.

Non-Published Commonly Owned U.S. Appl. No. 16/568,325, filed Sep. 12, 2019, 55 pages, VMware, Inc.

Non-Published Commonly Owned U.S. Appl. No. 16/568,330, filed Sep. 12, 2019, 55 pages, VMware, Inc.

Non-Published Commonly Owned U.S. Appl. No. 16/568,332, filed Sep. 12, 2019, 55 pages, VMware, Inc.

* cited by examiner

STATEFUL NETWORK SLICE SELECTION USING REPLAY OF CONNECTION HANDSHAKE

BACKGROUND

Communications service provider networks receive and process many types of traffic from many different types of devices, especially moving forward. For example, these networks will have traffic from mobile phones, Internet of Things (IoT) devices, self-driving automobiles, home computers, etc. Ideally, this traffic should be treated differently by the network based on the type of application (e.g., streaming video, web browsing, telephone calls, etc.), the type of device (e.g., data traffic for self-driving automobiles need extremely low latency), and other differentiators. While 4G and 5G standards have introduced a certain level of traffic differentiation, more adaptable network slicing, that can be generalized to other types of networks, is desirable.

BRIEF SUMMARY

Some embodiments provide methods for establishing a virtual service network across a set of datacenters. The set of datacenters across which the virtual service network is established may include, e.g., one or more public clouds, a software-defined wide area network (SD-WAN) that spans public and private clouds, a telecommunications service provider access network (e.g., spanning a combination of the radio access network, edge clouds, and core clouds), or other types of datacenters. The virtual service network of some embodiments includes multiple network slices each of which provides different network services to data messages assigned to the network slice.

In some embodiments, when a device (e.g., a mobile endpoint device in the telecommunications context) transmits a data message onto such a network, a network slice selector initially processes the data message. The network slice selector assigns the data message to one of the network slices of the virtual service network and handles service chaining operations to ensure that the data message is processed by the correct set of network services for the assigned slice. In different embodiments, this network slice selector may be implemented by a virtual machine (VM), a containerized function, a software forwarding element (e.g., a flow-based forwarding element) operating within a VM, within a container or within virtualization software of a host computer, a set of modules executing outside of a forwarding element (e.g., between a VM and a port of a forwarding element) within virtualization software of a host computer, a hardware forwarding element (e.g., a programmable switch), or other implementations.

In some cases, many network slice selectors are configured to implement a virtual service network. In the telecommunications service provider example, some embodiments configure a network slice selector for each cellular tower, base station, or other aspect of the access network. The telecommunications service provider access network of some embodiments includes edge clouds for each cellular tower, and configures at least one network slice selector at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM) or at a designated device (e.g., a specific nearby switch or router, a dedicated VM).

Each network slice of a virtual service network, in some embodiments, includes one or more network services such as firewalls, load balancers, network address translation, metering (e.g., for billing purposes), virtual private network (VPN) gateways, radio access network (RAN) functions (e.g., distributed unit and centralized unit functions), evolved packet core (EPC) functions (e.g., home subscriber server, serving gateway, packet data network gateway, mobility management entity), or other types of network functions. These network functions may be implemented as virtual network functions (VNFs), physical network functions (PNFs), and/or cloud network functions (CNFs) in different embodiments.

When a network slice selector assigns a data message to a network slice, the slice selector is responsible in some embodiments for performing the service chaining to ensure that the data message traverses the network services of the assigned slice in the correct order. In some embodiments, the slice selector transmits the data message to the first network service (e.g., the VM, container, or other data compute node that implements the network service) and maintains context information for that data message. Upon the first network service completing its processing of the data message, the first network service returns the data message to the slice selector. The slice selector then uses the maintained context information to transmit the data message to the next network service, and so on. In some embodiments, when the full network slice is implemented across multiple datacenters, a similar service chaining module operates at each datacenter to handle the service chaining for the slice within its own datacenter. These service chaining modules may be implemented in the same manner as the network slice selectors in some embodiments (e.g., as VMs, as forwarding elements in VMs or virtualization software). A service chaining module of some embodiments receives a data message as the data message ingresses to the datacenter, identifies the slice for the data message (e.g., based on context information provided with the data message by the network slice selector or service chaining module of the previous datacenter), and provides the data message to the next network service within the datacenter. Other embodiments use distributed service chaining rather than returning data messages to a designated slice selector or service chaining module in each datacenter (e.g., by adding tags to the packet headers to indicate the order of services in a selected network slice).

In some embodiments, a controller hierarchy configures various entities within the one or more datacenters to implement a virtual service network. A high-level controller (referred to herein as a virtual service network (VSN) controller) receives configuration data for the virtual service network from a user (e.g., a telecommunications provider, a datacenter tenant) through an interface (e.g., a set of REST APIs, a graphical interface, a command line interface). This VSN controller coordinates sets of other controllers that configure the entities in the datacenters in which the VSN is implemented. In some embodiments, each datacenter has its own suite of lower-level controllers. These controllers may include compute controllers (e.g., for configuring VMs that implement the VNFs), network controllers (e.g., for configuring forwarding elements to transmit data messages between the slice selector(s) and the network services), storage controllers, and SDN controllers (e.g., for configuring the slice selectors and/or gateways that transmit data messages between the datacenters).

Network slice selectors may assign data messages to slices using different techniques in different embodiments. Slice selection may be based on a combination of layer 2 to layer 4 (L2-L4) headers and/or by performing deep packet inspection (e.g., to classify traffic based on data in the layer 5 to layer 7 (L5-L7) headers. For example, slice selection may be based simply on the source device by using the source network layer (e.g., IP) address, or may be based on the type of traffic and/or destination network domain by looking at the higher layer (L5-L7) headers. In some embodiments, the network slice selector integrates with other control plane components to collect additional information about a connection (e.g., regarding the user session, device type, or other data) and uses this information as part of the slice selection process (e.g., using only this collected information or combining this information with the L2-L4 and/or L5-L7 packet header data). In some embodiments, the network slice selector maintains state for mapping connections to network slices so that deep packet inspection does not need to be performed on each data message of a connection. In addition, for some connections, only certain data messages contain the L5-L7 header information required for performing the slice selection.

When performing network slice selection using deep packet inspection, in certain cases the initial data message for a connection may not include the L5-L7 header information that the slice selector needs to correctly identify the slice. For example, a connection between an endpoint device (e.g., a mobile device such as a smart phone or tablet, a laptop or desktop computer, an IoT device, a self-driving automobile, a smart camera belonging to a security system, or other device) and a network domain (e.g., a web domain such as www.netflix.com, www.google.com, etc.) often begins with a set of connection initiation messages such as a TCP handshake. After completion of the handshake, the device then sends, e.g., an http get message that includes the network domain. Subsequent data messages sent between the device and the network domain may not include such information.

In some embodiments, the network slice selector acts as a proxy to terminate the connection initiation messages without sending these messages across the virtual service network to the intended destination. That is, the network slice selector exchanges the appropriate set of connection initiation messages with the endpoint device, such that the endpoint device behaves as though the connection has been properly set up with the destination domain. The network slice selector stores data about these connection initiation messages for subsequent use. Upon receiving a data message from the endpoint device (e.g., an http get message), the network slice selector performs deep packet inspection to examine the L5-L7 headers and select one of the network slices for the connection. The network slice selector then exchanges the connection initiation messages with the destination network domain, this time acting as the device rather than the destination domain. These connection initiation messages are transmitted via the selected network slice, such that all of the network services on the selected network slice process the connection initiation messages. Once this connection is established with the destination domain, the slice selector forwards the data message to the destination domain as well, via the selected network slice. The slice selector also stores connection information (e.g., a connection 5-tuple) mapping the connection to the selected network slice, for use in processing data messages. For subsequent data messages received for the connection, the network slice selector uses the mapping of the connection to the slice to assign the data message to the selected slice without the need to perform deep packet inspection. This avoids performing deep packet inspection on every data message for the connection, which may not be possible as the required information might not be in the L5-L7 headers of all of the data messages belonging to the connection. In some embodiments, an egress gateway that processes data messages after completion of the virtual service network also stores the connection-to-slice mapping information, and uses this to assign data messages sent from the destination domain to the endpoint device to the correct network slice (with the network services performed in the opposite order).

Some embodiments, rather than terminating the connection initiation messages at the slice selector, pass these messages through to a default network slice initially, then replay the messages over the correct network slice for the connection after the network slice is selected. In this procedure, the slice selector assigns the initial connection initiation messages to the default slice while storing these messages (or the data required to recreate the messages). In addition, the egress gateway (i.e., a gateway that transmits the messages out to the destination (e.g., to the Internet) and receives reverse-direction messages from the destination domain) stores information regarding the connection initiation messages as well. Upon receiving the initial data message, the network slice selector performs deep packet inspection to select the correct slice. Before transmitting the data messages onto the selected slice, however, the slice selector replays the connection initiation messages over the network slice. These messages are not sent from the egress gateway out to the destination domain; rather, the connection initiation messages are sent only between the slice selector and the egress gateway. Once these messages have been replayed, the network services of the selected slice will have processed the connection initiation messages and thus are prepared for the subsequent data message traffic between the endpoint device and the destination network domain.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide methods for establishing a virtual service network across a set of datacenters. The set of datacenters across which the virtual service network is established may include, e.g., one or more public clouds, a software-defined wide area network (SD-WAN) that spans public and private clouds, a telecommunications service provider access network (e.g., spanning a combination of the radio access network, edge clouds, and core clouds), or other types of datacenters. The virtual service network of some embodiments includes multiple network slices each of which provides different network services to data messages assigned to the network slice.

In some embodiments, when a device (e.g., a mobile endpoint device in the telecommunications context) transmits a data message onto such a network, a network slice selector initially processes the data message. The network slice selector assigns the data message to one of the network slices of the virtual service network and handles service chaining operations to ensure that the data message is processed by the correct set of network services for the assigned slice. In different embodiments, this network slice selector may be implemented by a virtual machine (VM), a containerized function, a software forwarding element (e.g., a flow-based forwarding element) operating within a VM, within a container or within virtualization software of a host computer, a set of modules executing outside of a forwarding element (e.g., between a VM and a port of a forwarding element) within virtualization software of a host computer, a hardware forwarding element (e.g., a programmable switch), or other implementations.

In some cases, many network slice selectors are configured to implement a virtual service network. In the telecommunications service provider example, some embodiments configure a network slice selector for each cellular tower, base station, or other aspect of the access network. The telecommunications service provider access network of some embodiments includes edge clouds for each cellular tower, and configures at least one network slice selector at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM) or at a designated device (e.g., a specific nearby switch or router, a dedicated VM or container).

Figure 1:
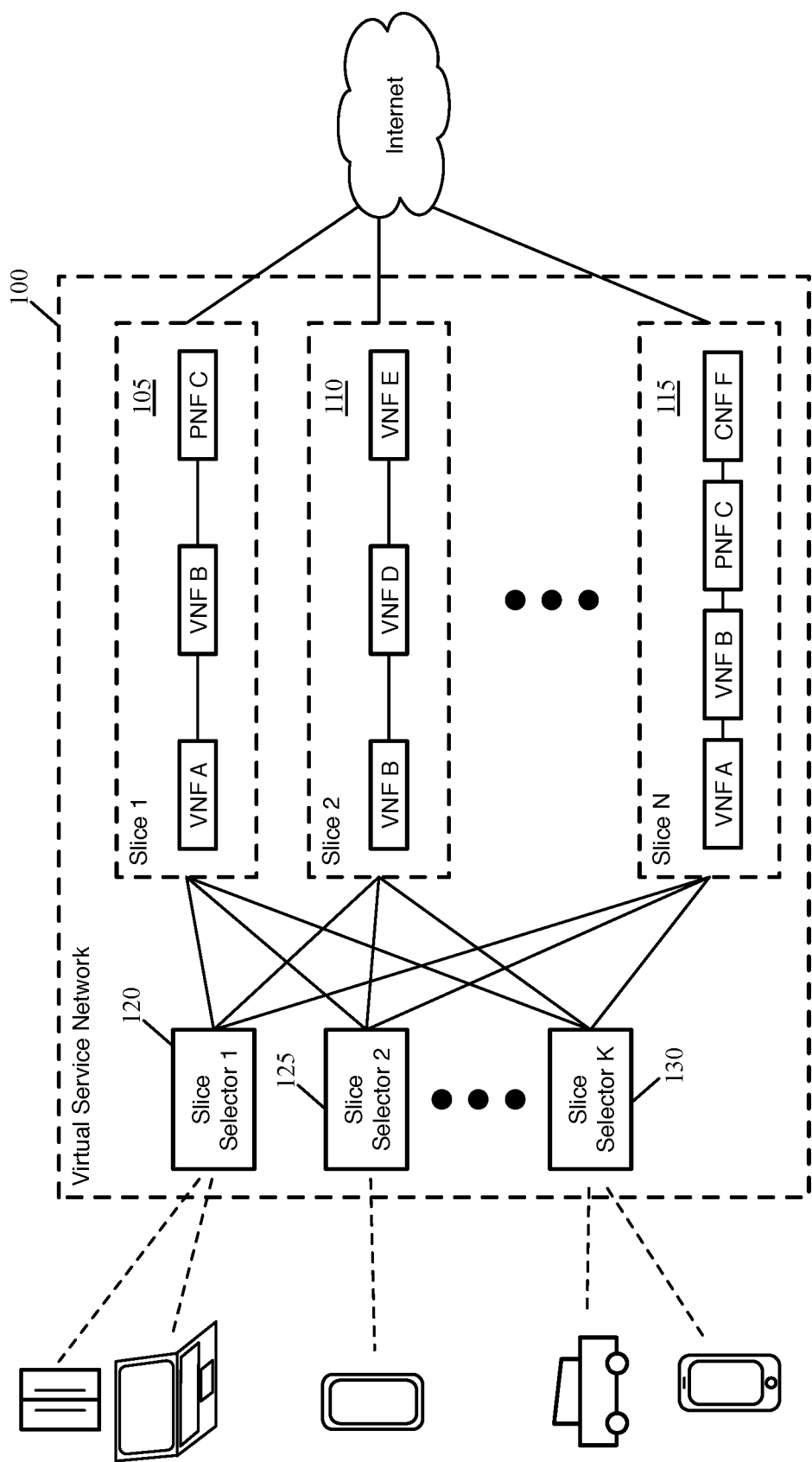
FIG. 1 conceptually illustrates a virtual service network (VSN) with multiple network slice selectors.

FIG. 1 conceptually illustrates such a virtual service network (VSN) 100 with multiple network slice selectors. In this case, the VSN 100 performs network services on data messages for devices accessing the Internet (e.g., within a telecommunications service provider access network). Which network services the VSN performs on a given data message is dependent on the slice to which the data message is assigned. As described further below, the network services of a given network slice may be implemented in a single data center or a combination of datacenters. For a given slice some of the network services might be distributed into many edge clouds while later network services are implemented in a central public datacenter.

As shown, the virtual service network 100 includes numerous (N) network slices 105-115. Each of these network slices represents a network service path (i.e., an ordered set of network services performed on data messages assigned to the slice). These network services can include firewalls, load balancers, network address translation, metering (e.g., for billing purposes) functions, VPN gateways, radio access network (RAN) functions (e.g., distributed unit and centralized unit functions), evolved packet core (EPC) functions (e.g., home subscriber server, serving gateway, packet data network gateway, mobility management entity), or other types of network functions.

In different embodiments, the network slices of a virtual service network may serve different purposes. Some embodiments slice a network based on the source device (e.g., using the source network address or information identifying the type of device) or subscriber information (e.g., by interfacing with authentication, authorization, and accounting systems or policy systems), while other embodiments slice a network based on the type of traffic (e.g., by performing deep packet inspection). Each network slice can have a prescribed quality of service (QoS) service-level agreement (SLA). For example, a network slice for self-driving automobiles might have extremely low latency requirements, a network slice for streaming video might have high bandwidth requirements, and an IoT slice might have less strict bandwidth or latency requirements for a single device but have a massive connectivity expectation.

These network services may be implemented as virtualized network functions (VNFs), physical network functions (PNFs), and/or cloud native network functions (CNFs) in different embodiments. VNFs are network services that are implemented in virtualized data compute nodes, such as virtual machines. This enables, for instance, the same network service configuration for a particular slice to be implemented in numerous edge clouds (e.g., along with the numerous slice selectors). CNFs are network services implemented in cloud-native data compute nodes, such as specific types of containers. Lastly, PNFs are network services implemented by a physical device (e.g., a specific firewall or load balancer device). In general, PNFs are more usefully located in centralized datacenters rather than edge clouds, so that the same physical device does not need to be replicated for each edge cloud.

In this example, the first network slice 105 includes two VNFs A and B as well as a PNF C. The second network slice 110 is entirely virtual, with three VNFs B, D, and E. The last network slice 115 includes the same three network services as slice 105 (VNFs A and B as well as PNF C) followed by a CNF F. In some embodiments, the same VM can implement a VNF for multiple different network slices. In this example, one VM might implement the same VNF B for all three of the illustrated network slices 105-115. If this VNF is located within the edge clouds, then a single VM may be instantiated in each edge cloud (e.g., for each slice selector). In other embodiments, however, a separate VNF (e.g., a separate VM or other data compute node) is instantiated for each VNF, even if the VNF configuration is the same for multiple slices. Thus, in this example, three different VNFs are instantiated for VNF B for each of the slices 105-115. Thus, if this VNF is located within the edge clouds, then each edge cloud would have three different VMs for VNF B.

Because of the manner in which devices access the network 100, some embodiments have numerous slice selectors 120-130. Devices may access a telecommunications service provider network through base stations (e.g., cell towers), wireless access points, wired hookups (e.g., within a home), or other means. For provider networks, the slice selectors of some embodiments are implemented close to the devices, so that the slice selection can occur before data traffic crosses most of the network. For instance, in the case of 5G wireless networks with multi-access edge computing, some embodiments configure a slice selector for each distributed unit (DU). Other embodiments configure a slice selector for each centralized unit (CU), which receives traffic from multiple DUs. In this case, each slice selector has an associated geographic range (i.e., that of its associated DU or CU).

In such situations, such as that shown in FIG. 1, each slice selector 120-130 is configured to perform the same slice selection function (i.e., they operate as a single logical slice selector) in some embodiments. That is, each slice selector 1-K can assign a data message to any of the slices 1-N, and the network slice assignment will be the same irrespective of which of the slice selectors 120-130 processes the data message. In other embodiments, slices are accessible only in certain specific geographical regions. For instance, a network slice associated with a specific application might be available in certain cities or other geographical areas in certain cases.

This example shows that multiple devices can attach to a given slice selector at any particular time. In the example, a smart refrigerator and a laptop are attached to the first slice selector 120, a tablet device is attached to the second slice selector 125, and an autonomous car and a mobile phone are attached to the last slice selector 130. In different embodiments, the network slice selectors may be implemented by a virtual machine (VM), a software forwarding element (e.g., a flow-based forwarding element) operating within a VM or within virtualization software of a host computer, a set of modules executing outside of a forwarding element (e.g., between a VM and a port of a forwarding element) within virtualization software of a host computer, a physical device (e.g., a dedicated hardware forwarding element, a physical host computer), a container application (e.g., a Kubernetes system running a network service mesh), or other implementations.

Figure 2:
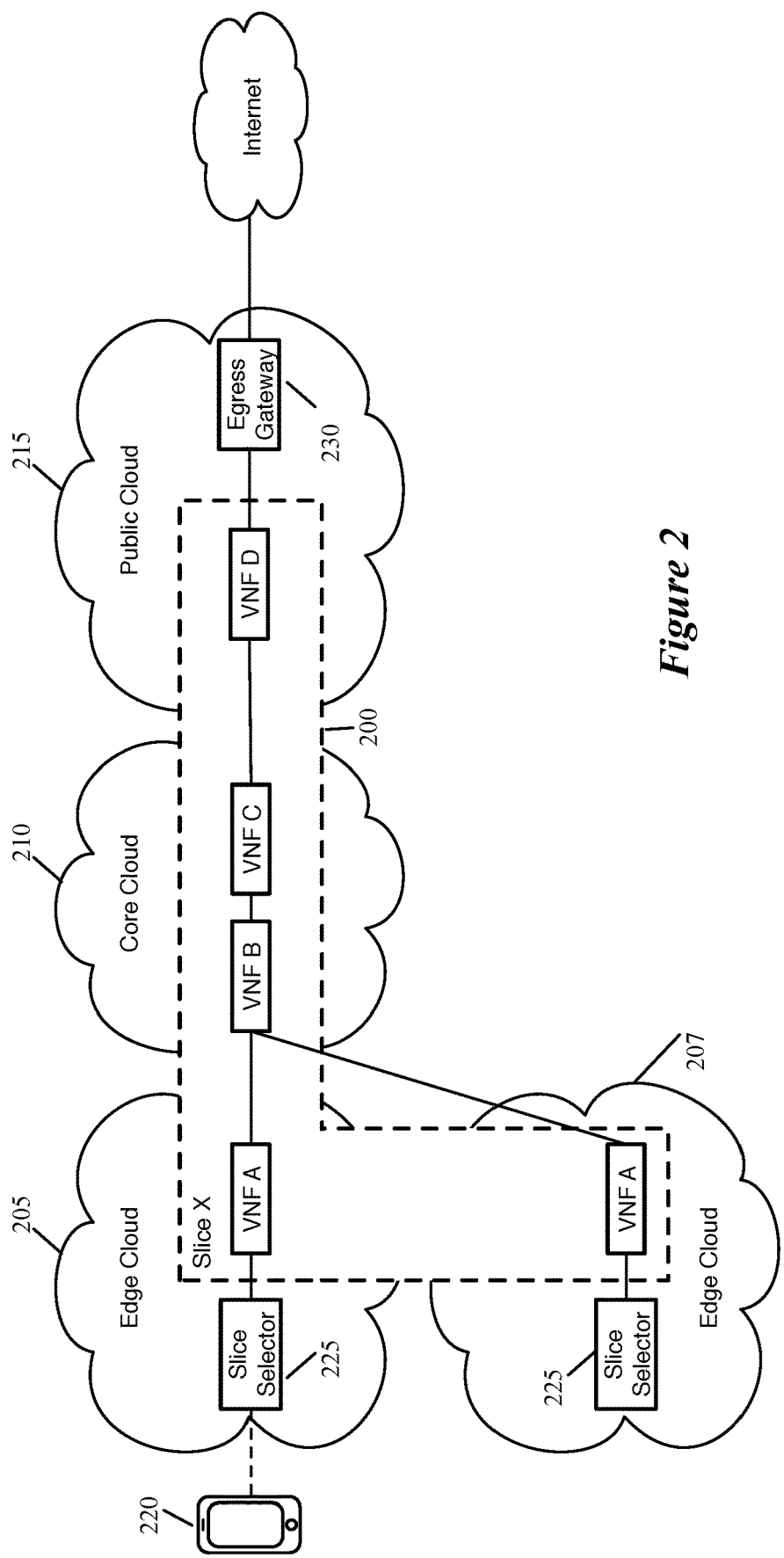
FIG. 2 conceptually illustrates the distribution of the services for a single network slice over multiple datacenters.

FIG. 2 conceptually illustrates the distribution of the services for a single network slice 200 over multiple datacenters 205-215. As shown, in this example, the network slice 200 includes four network services (VNFs A-D), which are applied to certain data traffic from the device 220 that is assigned to the network slice 200. The first VNF A is implemented in the edge clouds 205 and 207, the second and third VNFs B and C are implemented in the core cloud 210, and the fourth VNF D is implemented in a public cloud 215. In a network (e.g., a 5G network) that uses multi-access edge computing, the slice selector 225 and any network services that are implemented in the edge cloud are instantiated in each edge cloud. As such, both the edge cloud 205 and the edge cloud 207 each have instances of the slice selector 225 and the VNF A (as well as any network services implemented on the edge for any other slices of the same VSN or any other VSNs implemented across the network). In addition, though not shown, within each edge cloud some embodiments execute multiple slice selectors for high availability reasons (e.g., an active slice selector and a standby slice selector, or multiple active slice selectors to share the load of processing all incoming traffic).

In some embodiments, traffic from the device 220 initially passes through the radio access network (RAN), which is not shown in this figure. Some embodiments implement network slicing prior to the RAN (i.e., on the device side of the RAN), while in this example network slicing occurs after the RAN. Next, the data traffic arrives at the slice selector 225 (in the edge cloud 205), which analyzes the traffic and assigns the traffic to the network slice 200.

When the slice selector 225 assigns a data message to the network slice 200, the slice selector 225 is responsible in some embodiments for performing service chaining to ensure that the data message traverses the network services of the assigned slice (i.e., the VNFs A-D) in the correct order. In some embodiments, the slice selector 225 transmits the data message to the first network service (i.e., the VM that implements VNF A in the same edge cloud 205) and maintains context information for that data message. When VNF A completes its processing of the data message, the VNF returns the data message to the slice selector 225. If additional network services for the slice are also implemented in the edge cloud 225 (which is not the case for the slice 200), then the slice selector 225 would use the maintained context information to transmit the data message to the next network service, and so on.

In this case, the second network service VNF B is implemented in the core cloud 210. In some embodiments, the network slice selector 225 transmits the data message to a service chaining module at the core cloud (e.g., via wide area network (WAN) gateways that interconnect the clouds 205-215). In some embodiments, when the full network slice is implemented across multiple datacenters, a similar service chaining module operates at each datacenter to handle the service chaining for the slice within its own datacenter (e.g., in both the core cloud 210 and the public cloud 215). These service chaining modules may be implemented in the same manner as the network slice selectors in some embodiments (e.g., as VMs, as forwarding elements in VMs or virtualization software, as containers). Once the last network service is completed, in some embodiments an egress gateway 230 sends the data message to its destination via the Internet.

Figure 3:
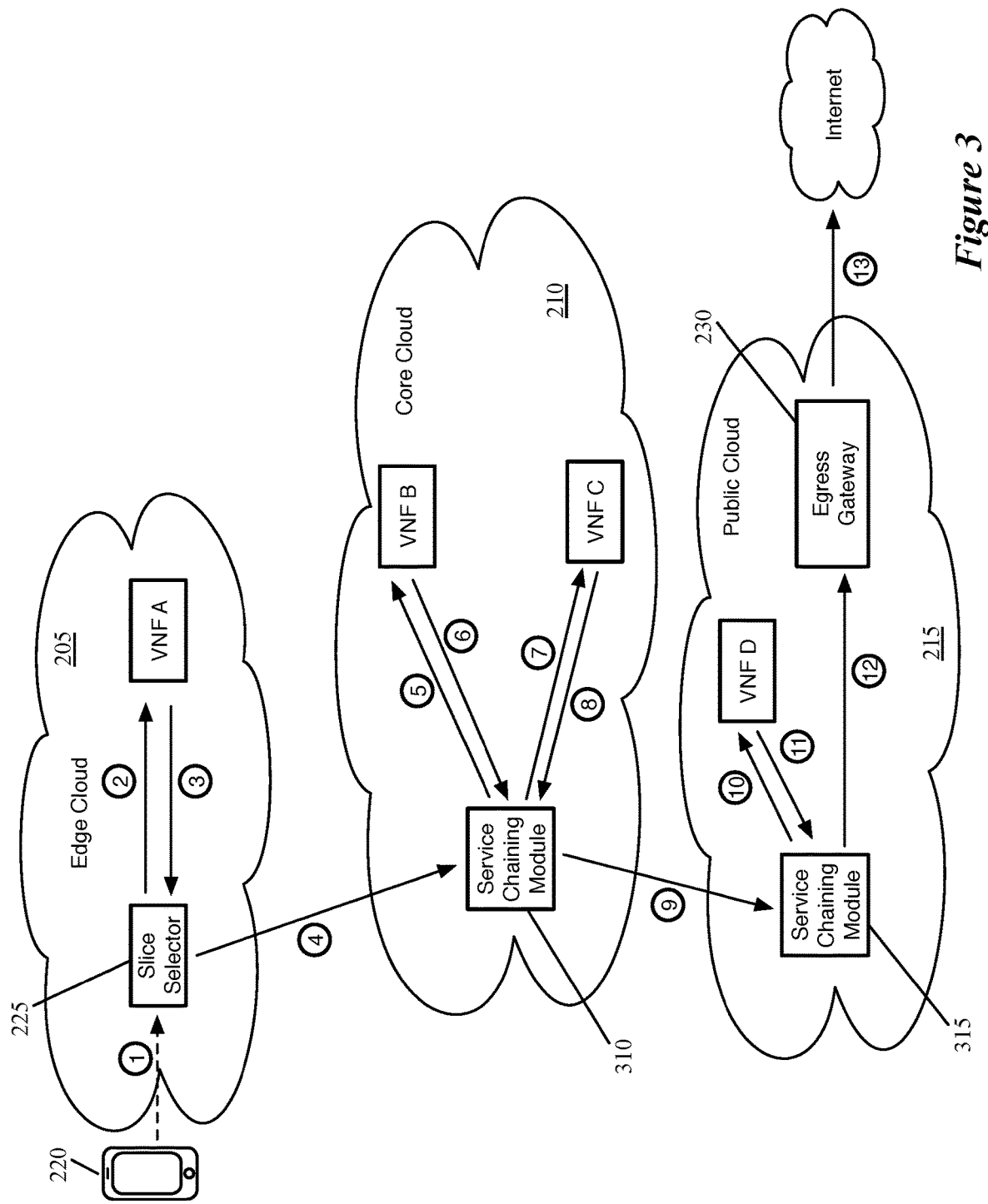
FIG. 3 conceptually illustrates the path a data message that is received at an edge cloud and assigned to the network slice shown in FIG. 2 by the slice selector at the edge cloud takes through the VSN according to some embodiments.

FIG. 3 conceptually illustrates this path that a data message received at the edge cloud 205 and assigned to the slice 200 by the slice selector 225 at that edge cloud takes through the VSN according to some embodiments. As shown by the encircled 1, the endpoint device 220 transmits a data message to the telecommunications provider access network, where it is processed by the slice selector 225 at the edge cloud 205. In some embodiments, the data message is initially processed by the RAN and/or EPC, if these portions of the access network are not part of the virtual service network (i.e., if the slice selector processes data messages after the RAN and/or EPC). The slice selector 225 in the edge cloud 205 assigns the data message to the slice 200 (e.g., based on deep packet inspection, L2-L4 headers, or other factors), and identifies that VNF A is (i) the first network service for this slice and (ii) also located in the edge cloud 205. As such, the slice selector 225 transmits the data message to VNF A (shown by the encircled 2), which processes the data message and returns it to the slice selector 225 (shown by the encircled 3).

Next, the slice selector 225 identifies that the next network service for the selected slice 200 is located in the core cloud 210, and thus transmits the data message to the service chaining module 310 that operates in the core cloud 210 (shown by the encircled 4) via WAN gateways (that are not shown in the figure for simplicity). In some embodiments, the service chaining module 310 uses a learning operation (e.g., MAC learning) to store the source of these data messages, so that reverse-direction traffic is sent to the slice selector 225 in the correct edge cloud 205 (i.e., as opposed to the edge cloud 207).

The service chaining module 310 in the core cloud 210 receives the data message as the data message ingresses to the core cloud 210 (after processing by a WAN gateway) and identifies the slice for the data message (e.g., based on context information provided with the data message by the slice selector 310, a stored slice mapping for the connection, or other factors). This service chaining module 310 provides the data message to the network services within the core cloud 210, in this case to VNF B and then to VNF C. As shown, the service chaining module sends the data message to VNF B (shown by the encircled 5), receives the data message back from VNF B (shown by the encircled 6), sends the message to VNF C (shown by the encircled 7), and receives the data message back from VNF C (shown by the encircled 8).

After the data message is processed by VNF C, the data message is transmitted by the service chaining module 310 to another service chaining module 315 (shown by the encircled 9) in the public cloud 215 (e.g., via WAN gateways interconnecting the core cloud 210 and the public cloud 215). The service chaining module 310 operates similarly to the service chaining module 310 in the core cloud 210 in some embodiments, using a learning mechanism to store information for processing return traffic. This service chaining module 310 within the public cloud 215 sends the data message to VNF D (shown by the encircled 10), which performs its network service and returns the data message to the service chaining module 315.

Lastly, the service chaining module 315 determines that the network slice processing is complete for the data message, and sends it to the egress gateway 230, which transmits the data message to its destination via the Internet. While this example shows connectivity between an endpoint device and an Internet domain, in the case of other virtual service networks the destination may instead be located within the public cloud or another datacenter connected via the WAN. The egress gateway 230 of some embodiments stores information mapping the connection to the network slice 200, so that reverse-direction traffic (i.e., data messages from the public Internet domain) are assigned to the same slice (with the network functions performed in the reverse direction). In other embodiments, the egress gateway 230 assigns data messages in a non-stateful manner (e.g., using the destination network address of the data messages). The egress gateway may be implemented together with the service chaining module in some embodiments (or with the original slice selector for virtual service networks that only span a single datacenter).

The slice selectors, network services (e.g., VNFs, CNFs, PNFs), as well as the various forwarding elements that handle transmission of data messages between these entities (e.g., software forwarding elements that tunnel data messages between host machines, WAN gateways) require configuration. In some embodiments, a centralized controller allows a user (e.g., a network administrator) to provide configuration for an entire VSN, and then a controller hierarchy configures the various entities within the one or more datacenters to implement this VSN.

Figure 4:
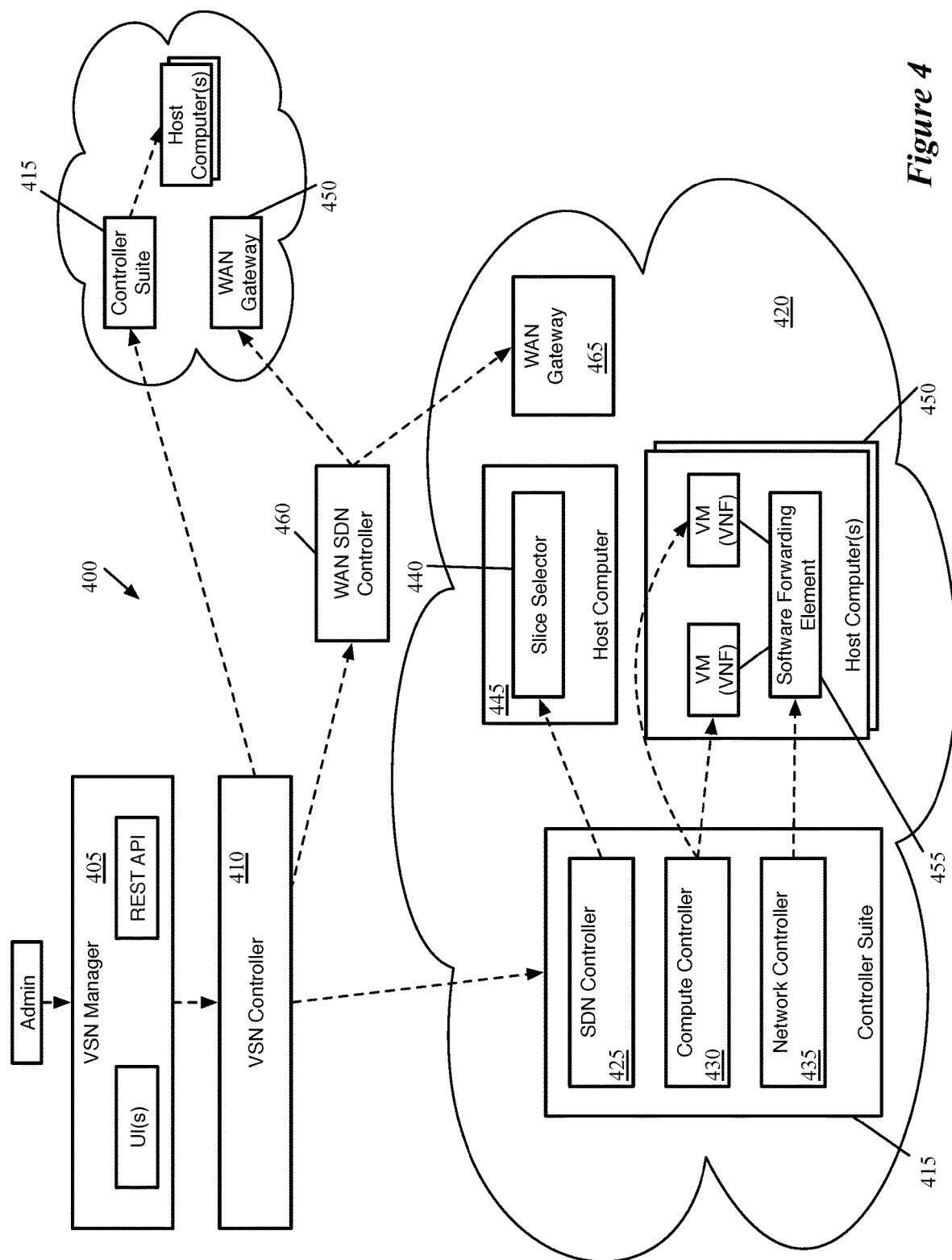
FIG. 4 conceptually illustrates a hierarchical set of controllers.

FIG. 4 conceptually illustrates such a hierarchical set of controllers 400. As shown in this figure, a high-level VSN manager 405 receives a VSN configuration from a network administrator (e.g., for a datacenter tenant, a telecommunications provider). The VSN manager 405 of some embodiments provides one or more interfaces (e.g., a graphical user interface, a command line interface, a set of REST APIs) through which the administrator provides this data. In some embodiments, the configuration data for a VSN specifies the different slices of the VSN, the slice selector configuration (i.e., the characteristics for assigning data messages to each of the different slices), the network service configurations for each network service on a slice, how each network services will be implemented (e.g., as VNFs, CNFs, or PNFs), the locations (e.g., edge clouds, core clouds, or other datacenters) for each network service, and/or other data.

The VSN controller 410 coordinates the centralized storage and distribution of this information to the other controllers in the hierarchy. In some embodiments, a suite of controllers 415 in each of the datacenters receives the VSN configuration data from the VSN controller 410 and configures the entities in the datacenters to implement the VSN. In some embodiments, each datacenter has its own suite of these lower-level controllers. These controller suites may be the same sets of controllers in each datacenter (e.g., a suite of controllers provided by a single company), or different sets of controllers (e.g., a different set of controllers for private edge and core clouds as compared to the public clouds).

The controller suite 415 in the first datacenter 420 includes a software-defined networking (SDN) controller 425, a compute controller 430, and a network controller 435. It should be understood that different embodiments may include additional controllers or may combine the functionality of multiple controllers into a single controller. For instance, some embodiments include an orchestrator that acts as a layer between the VSN controller 410 and the other controllers in the controller suite 415 (e.g., an openstack controller), or combine the SDN controller 425 features with those of the network controller 435. In addition, some embodiments include a storage controller for managing storage relevant to the VSN within the datacenter.

The SDN controller 425 configures the slice selector 440. In this example, a single slice selector 440 operates in the datacenter 420 (e.g., as a VM or within a VM on the host computer 445, in virtualization software of the host computer 445), though it should be understood that in other embodiments the slice selector 440 is implemented in a distributed manner within the datacenter. In some embodiments, the SDN controller 425 configures the slice selector with flow entries or other configuration data to assign data messages to the flows correctly and to perform service chaining operations to ensure that data messages are sent to the correct network services in the correct order within the datacenter 420. In addition, in datacenters that host network services but not the slice selectors (e.g., core clouds, public and/or private clouds for the telecommunications provider example), the SDN controllers of some embodiments configure the service chaining modules as well as the egress gateways (which may perform slice selection for reverse-direction data messages).

The compute controller 430 is responsible for instantiating and configuring the VNFs (e.g., as VMs in this example). In some embodiments, the VMs are instantiated on host computers 450 by the compute controller 430, which configures the VMs to implement the specified network service. In some embodiments, the compute controller 430 uses templates for firewalls, load balancers, or other network services for instantiating the VMs, then provides the specific configuration data for the network service as specified by the network administrator to the VM. In addition, the compute controller 430 of some embodiments is also responsible for configuring any CNFs and/or PNFs implemented in the datacenter 420.

The network controller 435 configures forwarding elements (e.g., the software forwarding element 455 or other types of forwarding elements such as programmable hardware forwarding elements) to implement the network connectivity between the network services and the slice selector 440. This configuration includes forwarding according to, e.g., a logical forwarding plane that connects the various entities of a slice (the slice selector and the network services), as well as performing encapsulation on data messages to tunnel those data messages between the entities within the datacenter. In addition to the software forwarding elements 455 (e.g., virtual switches operating in virtualization software) shown on the host computers 450, in some embodiments a similar software forwarding element executes in the host computer 445 to forward and encapsulate/decapsulate data messages to and from the slice selector 440. In some embodiments (e.g., when the slice selector is implemented in a distributed manner within the software forwarding elements or between the software forwarding elements and the VMs), the network controller 435 also receives the slice selector configuration and configures the appropriate network entities to implement the slice selector.

In addition to these controllers in the controller suite 415, some embodiments also include one or more WAN SDN controllers 460. The WAN SDN controller 460 is responsible for interconnecting the datacenters as needed, and configures WAN gateways 465 in each of the datacenters to do so. These WAN gateways may interconnect the datacenters using MPLS, SD-WAN, or other technologies for inter-datacenter communications. In many cases, not all of the datacenters will need direct communication. For instance, in the telecommunications example, the edge clouds may not need to communicate with each other, as data traffic is not sent between edge clouds but rather between an edge cloud and a core cloud.

In some embodiments, rather than communicating directly with the controllers in the controller suite 415 and the WAN SDN controller 460, the VSN controller 410 provides data to an agent in each datacenter and an agent for the WAN SDN controller 460. These agents are responsible for translating data from the VSN controller 410 (which may be provided in a uniform format for all controllers) into data that the various controller suites can use. In some embodiments, the VSN controller 410 pushes data in a policy format to the local agents, which translate this into data that instructs the various SDN controllers, compute controllers, and/or network controllers, to configure the datacenter components according to those policies. This allows the VSN controller 410 to use a single format to communicate with various different types of controller suites (e.g., different public cloud controllers, enterprise datacenter controller suites). Similarly, for the WAN SDN controller 460, the agent would convert the policies into WAN configuration instructions.

As mentioned above, network slice selectors may assign data messages to slices using different techniques in different embodiments. Slice selection may be based on packet header information, including layer 2 to layer 4 (L2-L4) headers and/or by performing deep packet inspection (e.g., to classify traffic based on data in the layer 5 to layer 7 (L5-L7) headers). For example, slice selection may be based simply on the source device by using the source network layer (e.g., IP) address, or may be based on the type of traffic and/or destination network domain by looking at the upper layer (L5-L7) headers.

In addition, in some embodiments the network slice selector integrates with other control plane components to collect additional information about a connection (e.g., regarding the user session, device type, or other data) and uses this information as part of the slice selection process (e.g., using only this collected information or combining this information with the L2-L4 and/or L5-L7 packet header data). Examples of such control plane components include Authentication, Authorization, and Accounting (AAA) protocols (e.g., Remote Authentication Dial-in User Service (RADIUS)), the Policy Control and Charging Rules Function (PCRF), or other such components that can provide device and/or user data to the slice selector.

In some embodiments, the network slice selector maintains state for mapping connections to network slices so that deep packet inspection does not need to be performed on each data message of a connection. In addition, for some connections, only certain data messages contain the L5-L7 header information required for performing the slice selection.

When performing network slice selection using deep packet inspection, in certain cases the initial data message for a connection may not include the L5-L7 header information that the slice selector needs to correctly identify the slice. For example, a connection between an endpoint device (e.g., a mobile device such as a smart phone or tablet, a laptop or desktop computer, an IoT device, a self-driving automobile, a smart camera belonging to a security system) and a network domain (e.g., a web domain such as www.netflix.com, www.google.com, etc.) often begins with a set of connection initiation messages such as a TCP handshake. After completion of the handshake, the device then sends, e.g., an http get message that includes the network domain. Subsequent data messages sent between the device and the network domain may not include such information.

Different embodiments use different techniques to identify the correct network slice for a connection while ensuring that (i) the connection is initiated correctly between the client (e.g., an endpoint device) and server (e.g., a web domain) and (ii) all of the messages are transmitted on the correct network slice, even if that network slice cannot be selected based on the first message. In some embodiments, the network slice selector acts as a proxy to terminate the connection initiation messages without sending these messages across the virtual service network to the intended destination. In other embodiments, the slice selector passes the connection initiation messages through to a default network slice initially, then replays the messages over the correct network slice for the connection after the network slice is selected.

Figure 5:
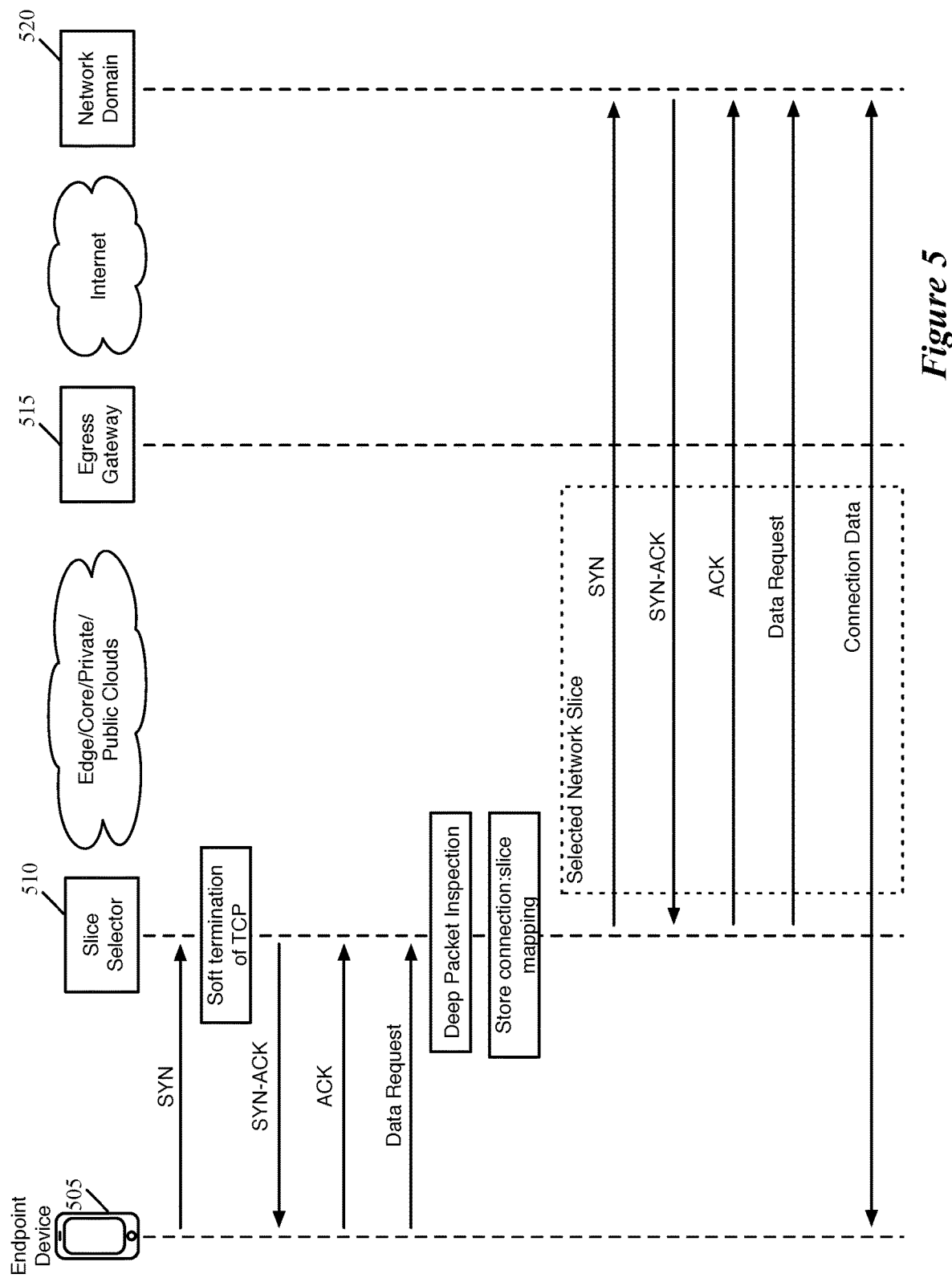
FIG. 5 illustrates a flow diagram that shows the interactions between an endpoint device, a slice selector, an egress gateway, and a network domain to transmit messages for a connection in which the slice selector acts as a soft termination proxy.

FIG. 5 illustrates a flow diagram that shows the interactions between an endpoint device 505, a slice selector 510, an egress gateway 515, and a network domain 520 (e.g., a server) to transmit messages for a connection in which the slice selector acts as a soft termination proxy. This example illustrates a connection that is initiated by the endpoint device 505 using a TCP three-way handshake, but the slice selector 510 of some embodiments is also capable of performing similar termination for other types of connection initiation messaging (e.g., TLS handshakes, QUIC connections over UDP). In this example, a set of private and public clouds (e.g., connected by SD-WAN or MPLS) host the virtual service network that is sliced (between the slice selector 510 and the egress gateway 515), while the egress gateway connects this VSN to the Internet (and the network domain 520).

As shown, the endpoint device 505 (e.g., a smart phone, a self-driving automobile, an IoT device) initially transmits a TCP SYN message directed to the network domain 520 (e.g., using a destination IP address for the network domain). Such a message may not have useful header information (e.g., L5-L7 header information) for the slice selector 510 to use in order to assign the connection being initiated to one of the network slices. As mentioned, in some embodiments the network slices are application-specific and/or device-specific, configured to meet latency, bandwidth, jitter, or other requirements of different applications or device types. Streaming video, self-driving vehicles, IoT devices, and other devices/applications all have different requirements that can be met by different network slices with different SLAs.

Rather than forwarding the connection initiation message (the SYN message) through the network to the Internet (and eventually the network domain 520), the slice selector 510 performs soft termination of the connection initiation. The slice selector 510 stores a record of the SYN message (i.e., the message itself or enough data to recreate the message) and replies to the endpoint device 505 with a SYN-ACK message. This SYN-ACK message is formatted as though the network domain received the SYN message and replied with the SYN-ACK message. This causes the endpoint device 505 to send an ACK message and behave as though the connection has been set up with the network domain 520. The slice selector 505 stores data about all of the connection initiation messages for subsequent use.

Based on the appearance of the connection having been setup properly, the endpoint device 505 then sends a data request message (or other message). This message will typically have L7 information (or other higher-layer information, such as a TLS server name indication) required by the slice selector to correctly assign the connection to a network slice. For instance, FIG. 6 conceptually illustrates an http get message 600. Such a message has an L3 header (L2 headers, etc. are not shown for simplicity) including source and destination IP addresses and a transport layer protocol field and an L4 header including source and destination port numbers. In addition, a portion of the L7 header of the message 600 includes a domain name within the http get command (in this case, www.exampledomain.com).

The slice selector 510 performs deep packet inspection on the data message (in this case, the data request) to identify the correct network slice for the connection. In some embodiments, this involves inspecting the L5-L7 headers (e.g., the http data shown in FIG. 6). In addition, the slice selector 510 stores state mapping the connection to the selected network slice, for use in processing subsequent data messages. In some embodiments, the slice selector stores this mapping as a connection 5-tuple (i.e., source and destination network address, transport layer protocol, source and destination transport layer ports) mapped to a slice identifier. In addition, some embodiments identify related connections that will require assignment to the same network slice and store state for these connections as well. As an example, a streaming video session will include, in some embodiments, multiple separate TCP connections (for audio and for different video resolutions).

Figure 7:
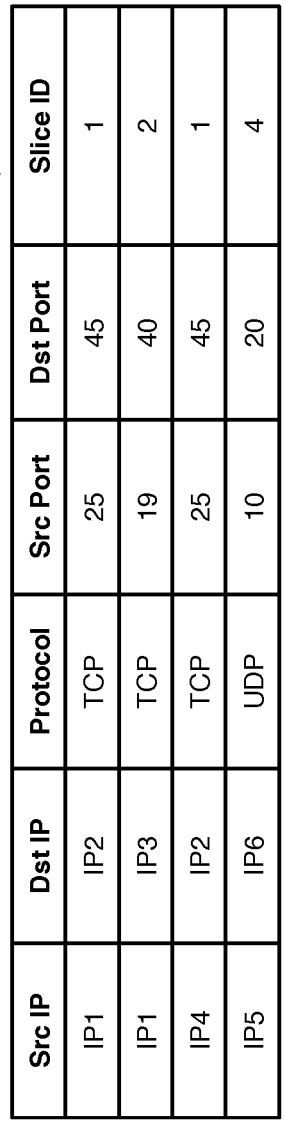
FIG. 7 illustrates entries for a connection mapping table of some embodiments stored by a slice selector.

FIG. 7 illustrates entries for a connection mapping table 700 of some embodiments stored by a slice selector. As shown, this table includes entries by the 5-tuple mapped to a slice identifier. In some embodiments, these entries are generated as flow entries for a flow-based forwarding element that implements the slice selector. For each flow entry, the match conditions are the connection 5-tuple and the action is to assign a data message to the specified slice. As this table 700 shows, a single source device (e.g., IP1) may have multiple ongoing connections that are assigned to multiple different network slices (e.g., for a concurrent web browsing connection and audio stream). In addition, a slice selector might assign connections for multiple different devices to the same slice (e.g., multiple self-driving automobiles, two devices streaming video simultaneously). In some embodiments, additional information besides the 5-tuple is included in the match condition (e.g., VLAN information or other virtual network identifiers).

The slice selector 510 then exchanges the connection initiation messages with the destination network domain, this time acting as the device rather than the destination domain. These connection initiation messages are transmitted via the selected network slice, such that all of the network services on the selected network slice process the connection initiation messages. As shown, the slice selector 510 transmits the SYN message to the network domain 520 via the selected network slice and the egress gateway 515. The egress gateway 515, in some embodiments, also stores connection to slice mapping state so that return traffic from the network domain 520 can also be transmitted via the selected network slice. The network domain 520 returns a SYN-ACK message, which the egress gateway 515 transmits via the selected network slice. This message does not reach the endpoint device 510, as the slice selector 510 recognizes the SYN-ACK message and returns the ACK message to the network domain (via the selected network slice). At this point, the connection is fully initiated between the endpoint device 505 and the network domain 520, as the entire 3-way handshake has been fully exchanged.

Figure 8:
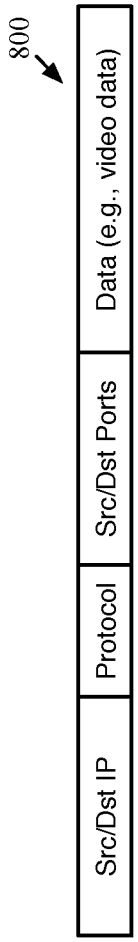
FIG. 8 conceptually illustrates a data message.

The slice selector 510 can then transmit the data request (i.e., the initial data message on which deep packet inspection was performed) to the network domain 520 via the selected network slice. Subsequent data messages for the connection are also exchanged between the endpoint device 505 and the network domain 520, and the slice selector 510 uses the stored state to assign this traffic to the selected network slice without performing deep packet inspection (as does the egress gateway 515 for return traffic). This avoids performing deep packet inspection on every data message for the connection, which may not be possible as the required information might not be in the L5-L7 headers of all of the data messages belonging to the connection. FIG. 8 conceptually illustrates such a data message 800. The data message 800 has similar L3 and L4 headers to those of the data message 600, but the L7 header does not include the same network domain information. Instead, the L7 portion of the data message includes payload data (e.g., video or audio data) that is not useful for the slice selector of some embodiments.

Figure 9:
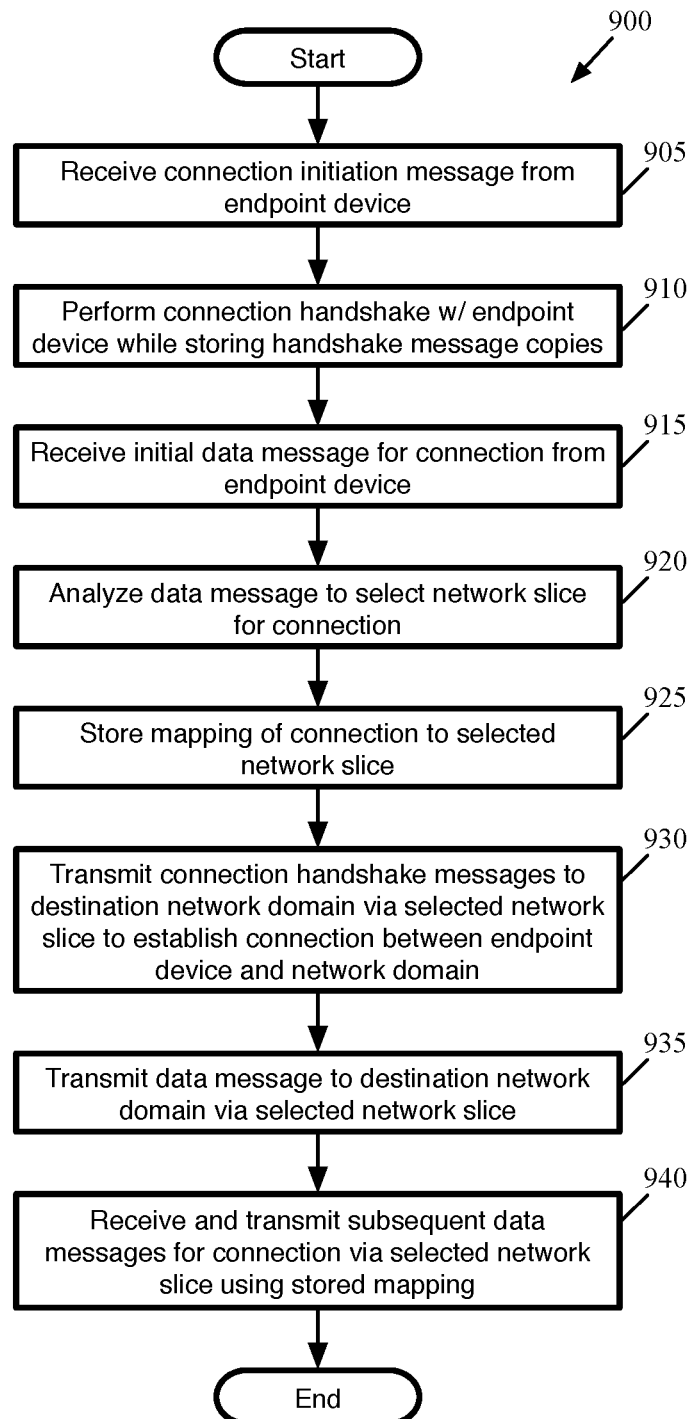
FIG. 9 conceptually illustrates a process of some embodiments for assigning a connection between an endpoint device and a destination network domain to a network slice of a VSN by terminating the connection handshake.

FIG. 9 conceptually illustrates a process 900 of some embodiments for assigning a connection between an endpoint device and a destination network domain to a network slice of a VSN by terminating the connection handshake. In some embodiments, the process 900 is performed by a slice selector such as the slice selector 510 shown in FIG. 5. Similar processes may be performed by slice selectors in other types of networks (e.g., intra-datacenter or inter-datacenter communication that does not reach the public Internet).

As shown, the process 900 begins by receiving (at 905) a connection initiation message from an endpoint device (e.g., a phone, a self-driving automobile, a tablet, an IoT device). This message may be a TCP SYN message, the initial message of a TLS handshake, a QUIC protocol message over UDP, or other connection initiation message. The process then performs (at 910) the rest of the connection handshake with the endpoint device while storing copies of the handshake messages (or data needed to recreate the handshake messages). For example, in the TCP 3-way handshake example, the slice selector exchanges SYN-ACK and ACK messages with the endpoint device, acting as the server in this handshake. For optimized single-message connection initiation (e.g., QUIC protocol), this operation is not required, and the slice selector either performs deep packet inspection on the initial message or on a subsequent message without performing a handshake with the endpoint device.

Once the connection has been setup on the endpoint device, the process 900 receives (at 915) an initial data message for the connection from the endpoint device. This may be an http get message such as that shown in FIG. 6, or another data message. In many cases, this data message will include information useful for performing slice selection, so the process 900 analyzes (at 920) the data message to select a network slice for the connection. This deep packet inspection may examine the name of the domain being contacted, the particular L7 protocol in use (e.g., to identify the type of application initiating the connection), or other information in the higher-layer headers of the data message. The process 900 also stores (at 925) state mapping the connection (e.g., using the 5-tuple) to the selected network slice. This information may be stored in a connection mapping table such as that shown in FIG. 7 (by, e.g., generating a new flow entry for the connection).

Next, the process 900 transmits (at 930) the connection handshake messages to the destination network domain via the selected network slice in order to establish the connection between the endpoint device and the network domain. In this exchange of messages, the slice selector acts as the endpoint device rather than the network domain, allowing the network domain server to setup the connection. This also allows the network services of the selected network slice to process the connection initiation messages, so that these services will be prepared for the subsequent data messages (e.g., a firewall would often be configured to reject data messages for a TCP connection for which it had not processed the original 3-way handshake messages).

The process 900 also transmits (at 935) the initial data message to the destination network domain via the selected network slice. In addition, the process 900 receives and transmits (at 940) subsequent data messages for the connection via the selected network slice using the stored connection mapping state. The stored state allows the slice selector to assign each data message for the connection from the endpoint device to the selected network slice without the need to perform deep packet inspection (which, as mentioned, may not even be possible for many of the subsequent data messages).

Figure 10:
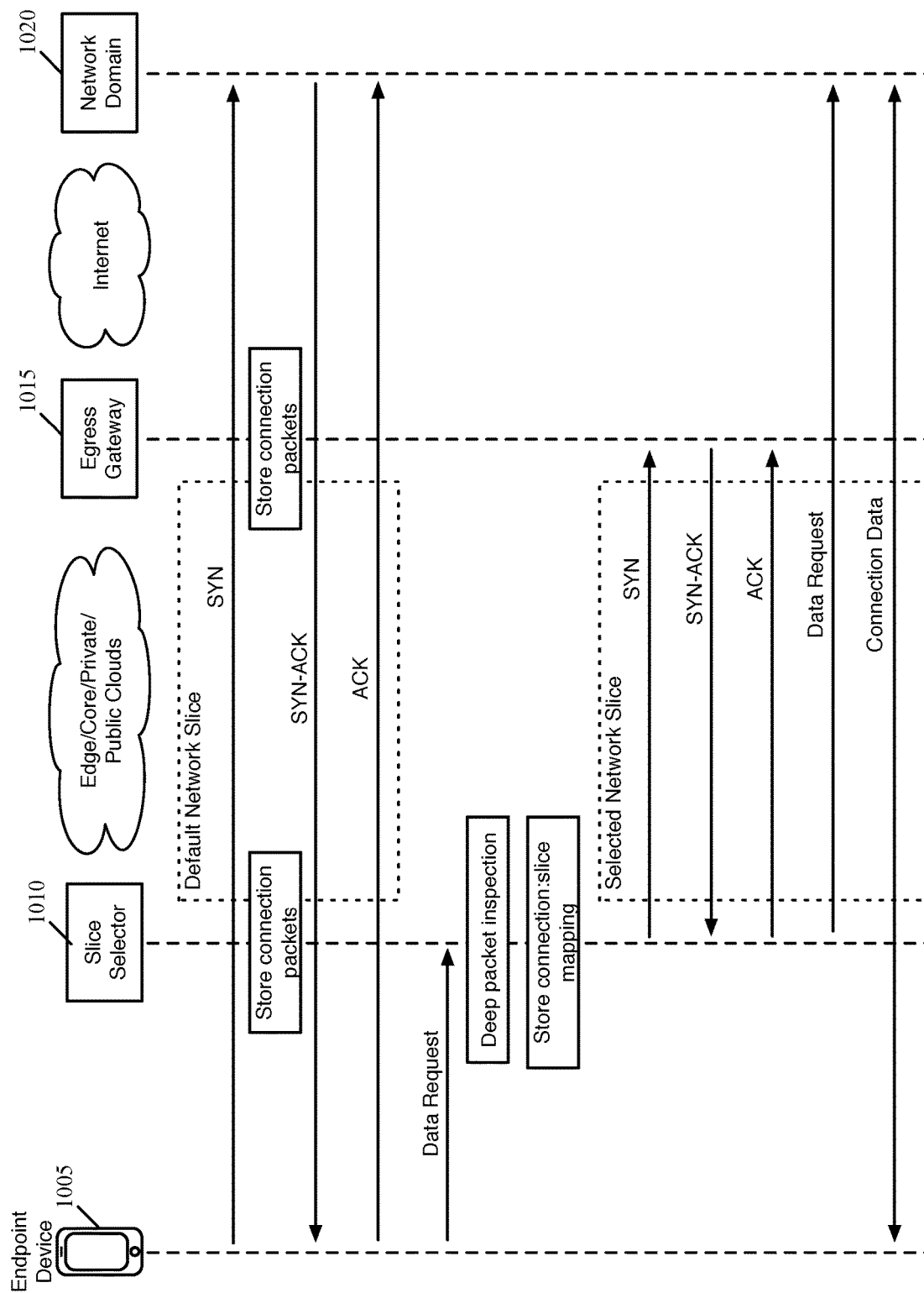
FIG. 10 illustrates a flow diagram that shows the interactions between an endpoint device, a slice selector, an egress gateway, and a network domain to transmit messages for a connection in which the slice selector and the egress gateway perform a handshake replay.

As mentioned, rather than terminating the connection initiation messages at the slice selector, some embodiments pass these messages through to the destination on a default network slice initially, then replay the messages over the correct network slice for the connection after the network slice is selected. FIG. 10 illustrates a flow diagram that shows the interactions between an endpoint device 1005, a slice selector 1010, an egress gateway 1015, and a network domain 1020 (e.g., a server) to transmit messages for a connection in which the slice selector and egress gateway perform a handshake replay. This example illustrates a connection that is initiated by the endpoint device 1005 using a TCP three-way handshake, but the slice selector 1010 of some embodiments is also capable of performing a similar replay for other types of connection initiation messaging (e.g., TLS handshakes, QUIC connections over UDP). In this example, a set of private and public clouds (e.g., connected by SD-WAN or MPLS) host the virtual service network that is sliced (between the slice selector 1010 and the egress gateway 1015), while the egress gateway 1015 connects this VSN to the Internet (and the network domain 1020).

As shown, the endpoint device 1005 (e.g., a smart phone, a self-driving automobile, an IoT device) initially transmits a TCP SYN message directed to the network domain 1020 (e.g., using a destination IP address for the network domain). Such a message does not have useful L5-L7 header information for the slice selector 1010 to use in order to assign the connection being initiated to one of the network slices, as described above. In this case, rather than terminating the handshake and responding to the endpoint device, the slice selector 1010 assigns the TCP SYN message to the default network slice and transmits the message through this network to the network domain 1020 (via the egress gateway 1015). In addition, both the slice selector 1010 and the egress gateway 1015 store records of the SYN message (i.e., the message itself or enough data to recreate the message). The network domain 1020 replies with a SYN-ACK message, which the egress gateway 1015 assigns to the default slice, and the slice selector treats the ACK message from the endpoint device 1005 similarly.

Figure 6:
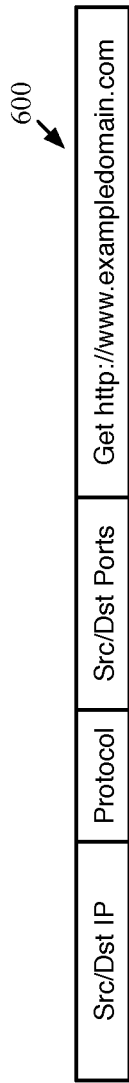
FIG. 6 conceptually illustrates an http get message.

With the connection setup between the endpoint device 1005 and the network domain 1020, the endpoint device 1005 then sends a data request message (or other message). This message will typically have L5-L7 information required by the slice selector to correctly assign the connection to an application-specific or device-specific network slice. FIG. 6, described above, conceptually illustrates an example of such a message 600.

The slice selector 1010 performs deep packet inspection on the data message (in this case, the data request) to identify the correct network slice for the connection. In some embodiments, this involves inspecting the L5-L7 headers (e.g., the http data shown in FIG. 6). In addition, the slice selector 1010 stores state mapping the connection to the selected network slice, for use in processing subsequent data messages. In some embodiments, the slice selector stores this mapping as a connection 5-tuple (i.e., source and destination network address, transport layer protocol, source and destination transport layer ports) mapped to a slice identifier, as shown in FIG. 7, which is described above. In addition, some embodiments identify related connections that will require assignment to the same network slice and store state for these connections as well. As an example, a streaming video session will include, in some embodiments, multiple separate TCP connections (for audio and for different video resolutions).

Before transmitting the data messages onto the selected slice, however, the slice selector replays the connection initiation messages over the selected network slice. The various network services of the selected slice will not have yet processed the connection initiation messages, and thus would be likely to reject data messages for the connection if these data messages were sent without replaying the handshake. Thus, as shown, the slice selector 1010 uses its stored data to exchange the TCP 3-way handshake messages with the egress gateway 515, which has also stored information for these messages. The SYN, SYN-ACK, and ACK messages are transmitted between the slice selector 1010 and the egress gateway 1015 via the selected network slice. These messages are not transmitted outside of the virtual service network (i.e., to either the endpoint device or the public Internet), because the connection has already been established between the endpoint device 1005 and the network domain 1020. The egress gateway 1015, in some embodiments, also stores the connection to slice mapping state so that return traffic from the network domain 1020 can be transmitted via the selected network slice.

Once these messages have been replayed, the network services of the selected slice will have processed the connection initiation messages and thus are prepared for the subsequent data message traffic between the endpoint device and the destination network domain. As shown, the slice selector 1010 transmits the data request (i.e., the initial data message on which deep packet inspection was performed) to the network domain 1020 via the selected network slice. Subsequent data messages for the connection are also exchanged between the endpoint device 1005 and the network domain 1020, and the slice selector 1010 uses the stored state to assign this traffic to the selected network slice without performing deep packet inspection (as does the egress gateway 1015 for return traffic). This avoids performing deep packet inspection on every data message for the connection, which may not be possible as the required information might not be in the L5-L7 headers of all of the data messages belonging to the connection (e.g., as shown by the data message 800 of FIG. 8).

Figure 11:
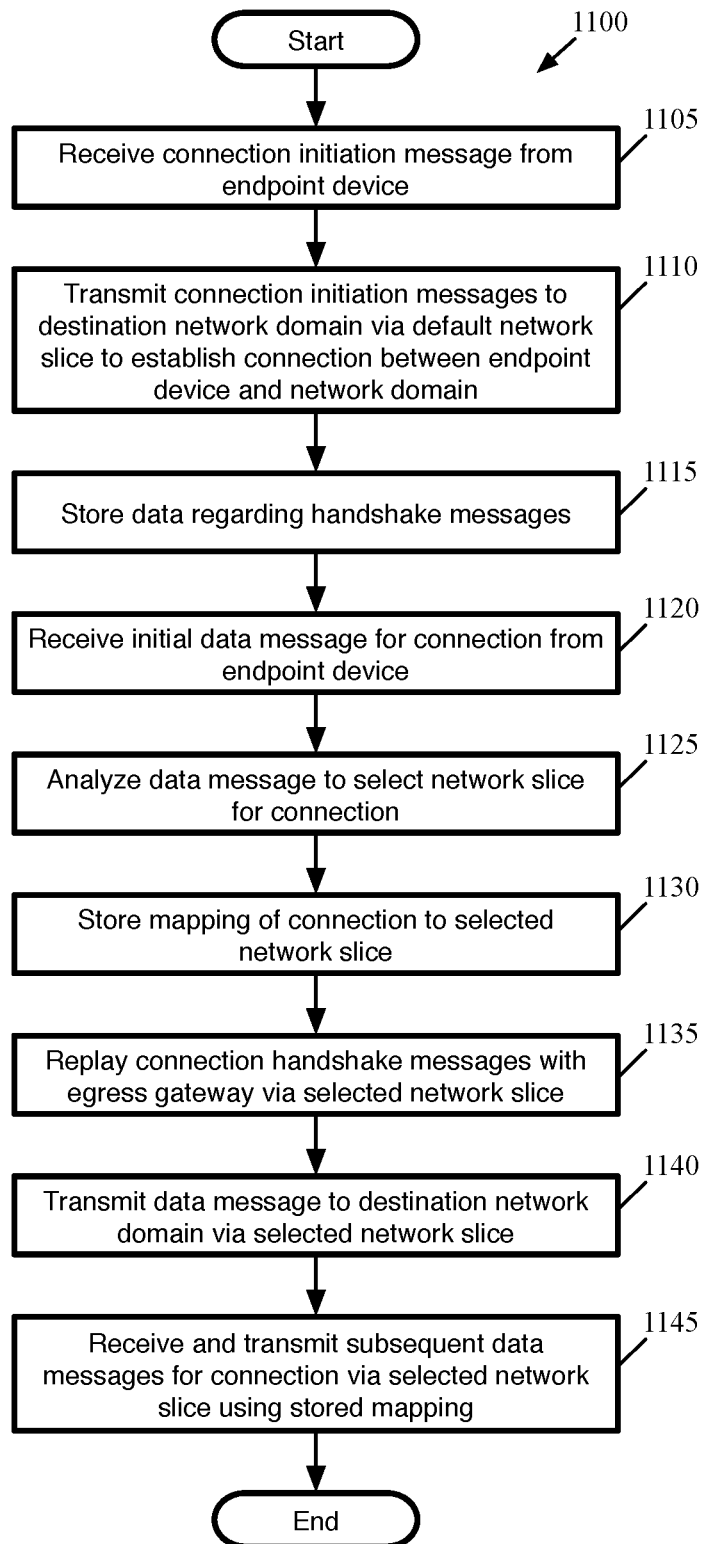
FIG. 11 conceptually illustrates a process of some embodiments for assigning a connection between an endpoint device and a destination network domain to a network slice of a VSN by replaying the connection handshake messages.

FIG. 11 conceptually illustrates a process 1100 of some embodiments for assigning a connection between an endpoint device and a destination network domain to a network slice of a VSN by replaying the connection handshake messages. In some embodiments, the process 1100 is performed by a slice selector such as the slice selector 1010 shown in FIG. 10. Similar processes may be performed by slice selectors in other types of networks (e.g., intra-datacenter or inter-datacenter communication that does not reach the public Internet).

As shown, the process 1100 begins by receiving (at 1105) a connection initiation message from an endpoint device (e.g., a phone, a self-driving automobile, a tablet, an IoT device). This message may be a TCP SYN message, the initial message of a TLS handshake, a QUIC protocol message over UDP, or other connection initiation message. The process then transmits (at 1110) the connection initiation messages (i.e., the initial message and any subsequent messages) to the destination network domain via a default network slice to establish the connection between the endpoint device and the network domain. Similarly, for return messages of the connection initiation handshake sent from the endpoint domain, the slice selector receives these messages via the default slice and transmits them to the endpoint device.

During the connection initiation handshake, the process stores (at 1115) data regarding the handshake messages (i.e., copies of the messages, or data needed to recreate the messages). For example, in the case of a TCP 3-way handshake, the slice selector stores the data in order to send SYN and ACK messages. For single-message connection initiation (e.g., QUIC protocol), this operation is not required, and the slice selector of some embodiments performs deep packet inspection on the initial message so as to avoid the need to use the default slice.

Once the connection has been setup on the endpoint device, the process 1100 receives (at 1120) an initial data message for the connection from the endpoint device. This may be an http get message such as that shown in FIG. 6, or another data message. In many cases, this data message will include information useful for performing slice selection, so the process 1100 analyzes (at 1125) the data message to select a network slice for the connection. This deep packet inspection may examine the name of the domain being contacted, the particular L7 protocol in use (e.g., to identify the type of application initiating the connection), or other information in the higher-layer headers of the data message. The process 1100 also stores (at 1130) state mapping the connection (e.g., using the 5-tuple) to the selected network slice. This information may be stored in a connection mapping table such as that shown in FIG. 7 (e.g., by generating a new flow entry for the connection).

Next, the process 1100 replays (at 1135) the connection handshake messages with the egress gateway via the selected network slice. In this exchange of messages, the slice selector acts as the client (i.e., the endpoint device) and the egress gateway acts as the server (i.e., the network domain). In the TCP 3-way handshake example, the slice selector sends a SYN message, receives a SYN-ACK message from the egress gateway, and sends an ACK message. This serves the purpose of allowing the network services of the selected network slice to process the connection initiation messages, so that these services will be prepared for the subsequent data messages (e.g., a firewall would often be configured to reject data messages for a TCP connection for which it had not processed the original 3-way handshake messages).

The process 1100 also transmits (at 1140) the initial data message to the destination network domain via the selected network slice. In addition, the process 900 receives and transmits (at 1145) subsequent data messages for the connection via the selected network slice using the stored connection mapping state. The stored state allows the slice selector to assign each data message for the connection from the endpoint device to the selected network slice without the need to perform deep packet inspection (which, as mentioned, may not even be possible for many of the subsequent data messages).

Figure 12:
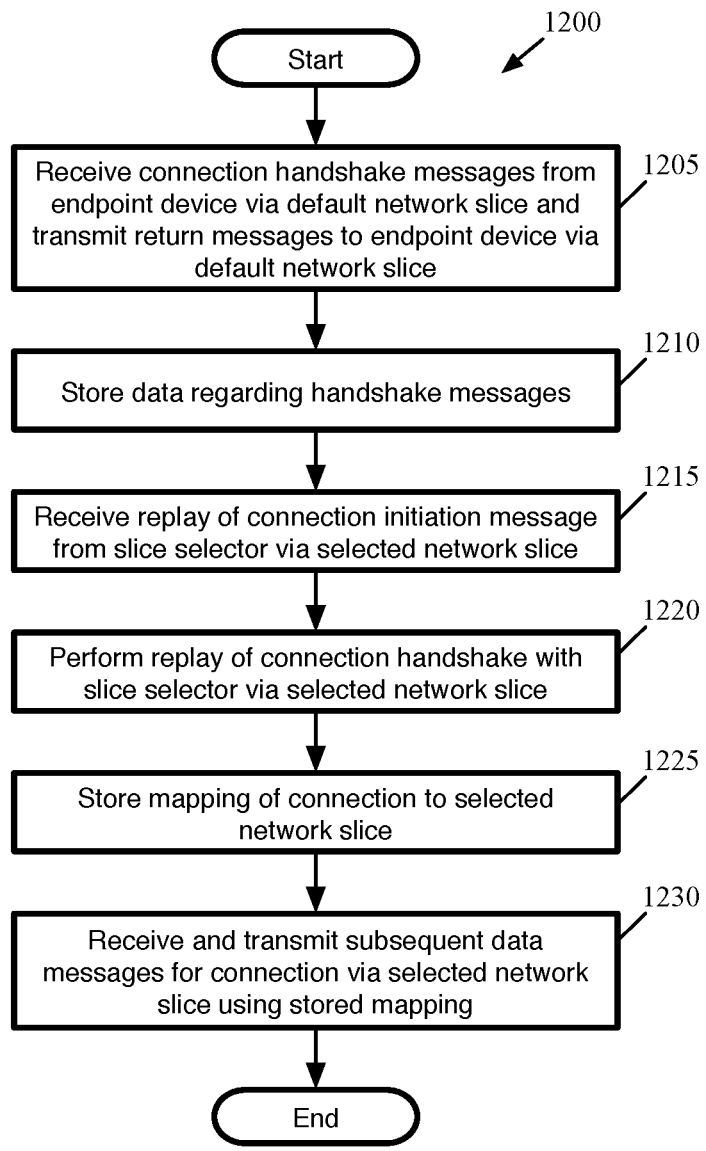
FIG. 12 conceptually illustrates a process of some embodiments for the egress gateway during the handshake replay case.

FIG. 12 conceptually illustrates a process 1200 of some embodiments for the egress gateway during the handshake replay case. In the example shown in FIG. 10 (i.e., in which the VSN is implemented on a telecommunications service provider access network), the egress gateway that performs the process 1200 is the gateway that connects the VSN to the public Internet.

As shown, the process 1200 begins by receiving (at 1205) a set of connection handshake messages from an endpoint device via a default network slice and transmitting return messages from the destination network domain for the connection to the endpoint device via a default network slice. The egress gateway receives the messages sent by the endpoint device and transmits these messages to their destination in addition to receiving the return traffic and sending this onto the default network slice towards the slice selector (and eventually the endpoint device). In addition, the process 1200 stores (at 1210) data regarding the handshake messages (i.e., copies of the messages, or data needed to recreate the messages). For example, in the case of a TCP 3-way handshake, the egress gateway stores the data in order to send the SYN-ACK message. single-message connection initiation (e.g., QUIC protocol), this operation is not required, and the slice selector of some embodiments performs deep packet inspection on the initial message so as to avoid the need to use the default slice or perform handshake replay.

Once the connection has been setup between the endpoint device and the network domain, the process 1200 receives (at 1215) a replay of the connection initiation message from the slice selector via the selected network slice. The slice selector, at this point, would have received a data message from the endpoint device, used deep packet inspection to assign the connection to a particular one of the possible network slices, and then begun the replay process by sending the initial connection initiation message to the egress gateway. The process 1200 performs (at 1220) the complete replay of the connection handshake with the slice selector via the selected network slice using the stored data for these messages. That is, the egress gateway recognizes the initial connection initiation message as corresponding to a stored set of handshake message data and uses that stored set of data to perform the replay. For instance, in the TCP 3-way handshake example, the egress gateway receives as SYN message, sends the SYN-ACK message to the slice selector, and receives the ACK message. This enables the network services of the selected network slice to process the full set of handshake messages and be prepared for the rest of the data belonging to the connection.

The process 1200 stores (at 1225) state mapping the connection (e.g., using the 5-tuple) to the selected network slice. This information may be stored in a connection mapping table such as that shown in FIG. 7 (e.g., by generating a new flow entry for the connection if the gateway is a flow-based forwarding element). Using this stored state, the process 1200 receives (at 1230) and transmits subsequent return data messages (i.e., from the public network domain) belonging to the connection to the endpoint device via the selected network slice.

Other embodiments may use other techniques to build up the state that maps connections to network slices. In some embodiments, the slice selector integrates (e.g., over a control plane channel) with an external component that provides a populated connection-to-slice mapping table to the slice selector, which the slice selector uses to perform stateful slice selection (thereby avoiding the requirement for the slice selector to perform deep packet inspection). The external component, in different embodiments, may provide an entirely pre-populated connection-to-slice mapping table or gradually populate the table with updates as endpoint devices initiate connections. As an example, the slice selectors of some embodiments can integrate with the 5G Network Slice Selection Function (NSSF), allowing the NSSF to define the connection-to-slice mapping. In some such embodiments, the NSSF provides the mapping state to the slice selector, which uses the state to select the correct slice for data packets. That is, an offline external component provides the connection-to-slice mapping state and the slice selector enforces this state in the data plane.

Figure 13:
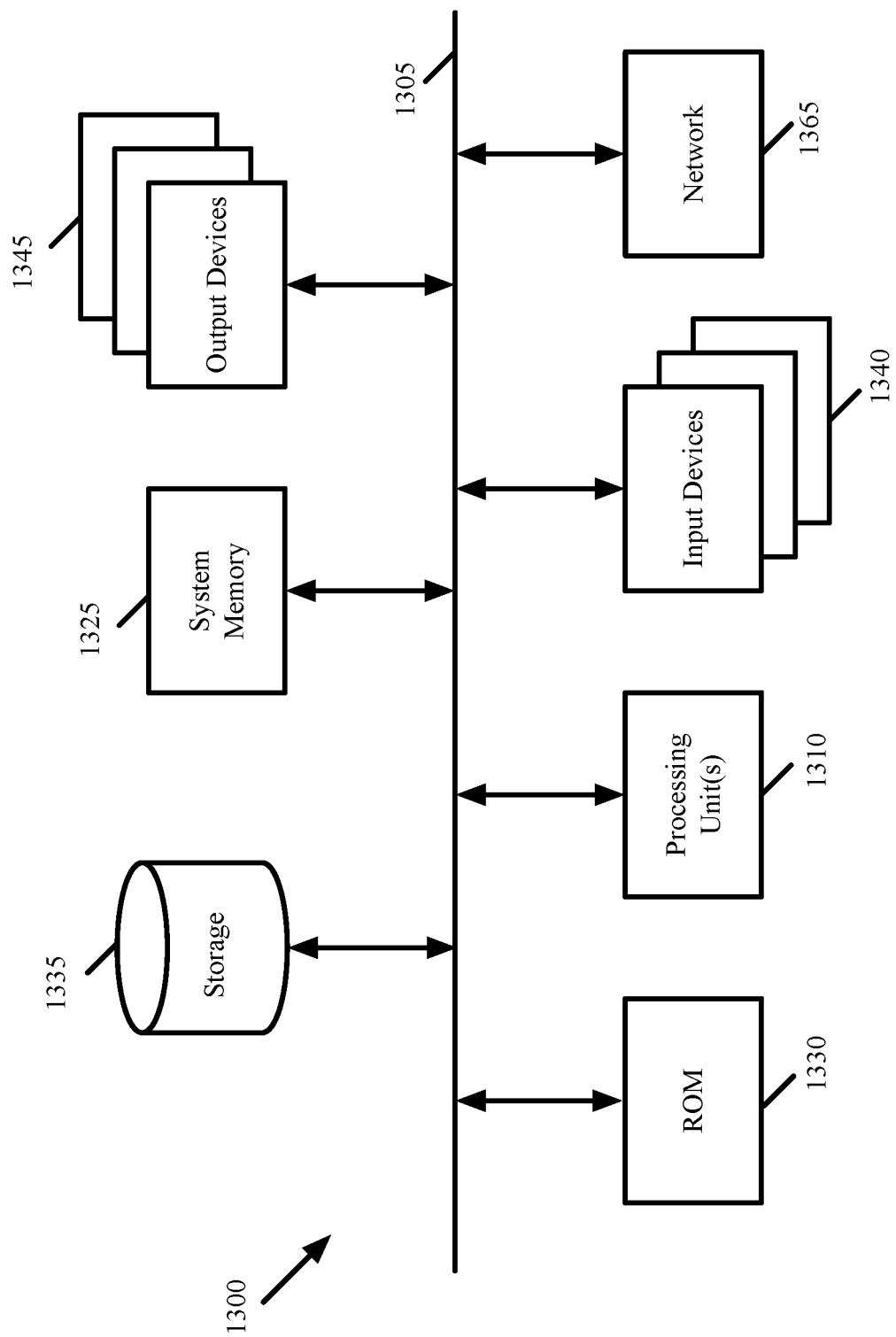
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random-access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given may be any type of DCNs, including physical hosts, VMs, non-VM containers, and hypervisor kernel network interface modules. In fact, the example networks might include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 11, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network slice selector that forwards messages from endpoint electronic devices onto different network slices of a plurality of network slices, a method comprising:
   receiving a set of connection initiation messages setting up a connection between an endpoint electronic device and a network domain;
   forwarding the set of connection initiation messages from the endpoint electronic device onto a default network slice while storing data regarding the connection initiation messages;
   after the connection is setup, receiving a data message belonging to the connection from the endpoint electronic device;
   selecting one of the plurality of network slices to which the electronic device has access as the network slice for the connection based on analysis of the received data message; and
   retransmitting the set of connection initiation messages on the selected network slice between the network slice selector and a network gateway.

2. The method of claim 1, wherein the set of connection initiation messages received from the endpoint electronic device comprises a transmission control protocol (TCP) SYN message and a TCP ACK message, wherein the network gateway receives a TCP SYN-ACK message from the network domain and forwards the TCP SYN-ACK message onto the default network slice.

3. The method of claim 2, wherein retransmitting the set of connection initiation messages comprises:
transmitting a copy of the SYN message to the network gateway on the selected network slice;
receiving a copy of the SYN-ACK message sent from the network gateway on the selected network slice; and
transmitting a copy of the ACK message to the network gateway on the selected network slice.

4. The method of claim 1, wherein the network slice selector and network gateway store data regarding the set of connection initiation messages between receiving the set of connection initiation messages and retransmitting the set of connection initiation messages.

5. The method of claim 1 further comprising forwarding the data message and subsequent data messages belonging to the connection onto the selected network slice.

6. The method of claim 1, wherein selecting the network slice comprises:
performing deep packet inspection on the received data message to identify information about the connection; and
selecting the network slice based on the identified information.

7. The method of claim 6, wherein the information about the connection comprises at least one of (i) a destination domain name and (ii) information identifying a type of data being transmitted via the connection.

8. The method of claim 1, wherein the selected network slice comprises a set of network services to be applied to data messages forwarded onto the selected network slice.

9. The method of claim 8, wherein the selected network slice is a first network slice and the set of network services is a first set of network services, wherein the plurality of network slices comprises at least a second network slice that comprises a second set of network services to be applied to data messages forwarded onto the second network slice.

10. The method of claim 8, wherein the network services are applied to the data messages between the network slice selector and the network gateway.

11. The method of claim 1, wherein the network gateway receives subsequent data messages belonging to the connection sent from the network domain and forwards said subsequent data messages onto the selected network slice.

12. A non-transitory machine readable medium storing a network slice selector which when executed by at least one processing unit forwards messages from endpoint electronic devices onto different network slices of a plurality of network slices, the network slice selector comprising sets of instructions for
receiving a set of connection initiation messages setting up a connection between an endpoint electronic device and a network domain;
forwarding the set of connection initiation messages from the endpoint electronic device onto a default network slice while storing data regarding the connection initiation messages;
after the connection is setup, receiving a data message belonging to the connection from the endpoint electronic device;
selecting one of the plurality of network slices to which the electronic device has access as the network slice for the connection based on analysis of the received data message; and
retransmitting the set of connection initiation messages on the selected network slice between the network slice selector and a network gateway.

13. The non-transitory machine readable medium of claim 12, wherein the set of connection initiation messages received from the endpoint electronic device comprises a transmission control protocol (TCP) SYN message and a TCP ACK message, wherein the network gateway receives a TCP SYN-ACK message from the network domain and forwards the TCP SYN-ACK message onto the default network slice.

14. The non-transitory machine readable medium of claim 13, wherein the set of instructions for retransmitting the set of connection initiation messages comprises sets of instructions for:
transmitting a copy of the SYN message to the network gateway on the selected network slice;
receiving a copy of the SYN-ACK message sent from the network gateway on the selected network slice; and
transmitting a copy of the ACK message to the network gateway on the selected network slice.

15. The non-transitory machine readable medium of claim 12, wherein the network slice selector and network gateway store data regarding the set of connection initiation messages between receiving the set of connection initiation messages and retransmitting the set of connection initiation messages.

16. The non-transitory machine readable medium of claim 12, wherein the network slice selector further comprises a set of instructions for forwarding the data message and subsequent data messages belonging to the connection onto the selected network slice.

17. The non-transitory machine readable medium of claim 12, wherein the set of instructions for selecting the network slice comprises sets of instructions for:
performing deep packet inspection on the received data message to identify information about the connection; and
selecting the network slice based on the identified information.

18. The non-transitory machine readable medium of claim 12, wherein the network gateway receives subsequent data messages belonging to the connection sent from the network domain and forwards said subsequent data messages onto the selected network slice.

19. A system comprising:
a first computing device executing a network slice selector; and
a second computing device executing a network gateway, wherein the network slice selector:
receives a set of connection initiation messages setting up a connection between an endpoint electronic device and a network domain;
forwards the set of connection initiation messages from the endpoint electronic device onto a default network slice to the network domain via the network gateway while storing data regarding the connection initiation messages;
receives a data message belonging to the connection from the endpoint electronic device after the connection is setup;

selects one of a plurality of network slices to which the electronic device has access as the network slice for the connection based on analysis of the received data message; and retransmits the set of connection initiation messages on the selected network slice to the network gateway.

20. The system of claim 19, wherein the first computing device and second computing device are located in different datacenters.

21. The system of claim 19, wherein:

the network slice selector receives a TCP SYN message from the endpoint electronic device and forwards the TCP SYN message onto a default network slice to the network domain via the network gateway;

the network gateway receives a TCP SYN-ACK message from the network domain and forwards the TCP SYN-ACK message onto the default network slice to the endpoint electronic device via the network slice selector;

the network slice selector receives a TCP ACK message from the endpoint electronic device and forwards the TCP ACK message onto the default network slice to the network domain via the network gateway.

22. The system of claim 21, wherein, after the network slice selector selects the network slice:

the network slice selector transmits a copy of the SYN message to the network gateway on the selected network slice;

the network gateway transmits a copy of the SYN-ACK message to the network slice selector on the selected network slice; and the network slice selector transmits a copy of the ACK message to the network gateway on the selected network slice.

23. The system of claim 19, wherein the network slice selector and network gateway store data regarding the set of connection initiation messages between receiving the set of connection initiation messages and retransmitting the set of connection initiation messages.

* * * * *